UNITED STATES PATENT OFFICE.

AUGUST SAMUEL LEOPOLD LEONHARDT, OF BERLIN, PRUSSIA.

IMPROVED METHOD OF PREPARING ANILINE COLORS FOR DYEING AND PRINTING.

Specification forming part of Letters Patent No. 49,958, dated September 12, 1865.

*To all whom it may concern:*

Be it known that I, AUGUST SAMUEL LEOPOLD LEONHARDT, of Berlin, in the Kingdom of Prussia, at present temporarily residing at Warrington, in the county of Lancaster and Kingdom of England, have invented new and useful Improvements in Treating Aniline Colors for Dyeing and Printing; and I do hereby declare that the following is a full and exact description thereof.

I take the blue and violet colors of commerce obtained from magenta, and which are insoluble in water, in the wet or dry state and dissolve them completely in a sufficient quantity of strong alcohol, and I precipitate the color from this solution in an extremely fine state of subdivision, as follows: I allow it to fall into a sufficiently large quantity of cold water or a cold solution of any neutral salt, (such as common salt, chloride of calcium, sulphate of soda, or other suitable neutral salt,) or I allow it to fall into a sufficiently large quantity of cold water containing caustic alkali, (such as caustic potash, soda, or ammonia, or their carbonates,) so as to remove as much as possible the acid, either free or combined, contained in the colors, and I keep the fluid used for the precipitation in a constant brisk agitation.

By any of the aforesaid means I obtain these colors in an extremely fine state of subdivision, whereby they are rendered more easily soluble in slightly-acidulated hot water. After precipitation I collect the insoluble matter on a filter and wash it well. The filtrate, consisting of the alcohol mixed with a large quantity of water, is then distilled to recover the said alcohol, and the precipitate without further preparation is ready for use in dyeing and printing.

In carrying this invention into practical effect I find the following proportions and quantities to answer very well, though I do not confine myself strictly to the quantities set forth, as they are capable of modification: I take one part, by weight, of any of the aforesaid named dry aniline colors of commerce and dissolve them in from twenty to forty parts of the strongest boiling alcohol. The light shades of violet require the least alcohol, and the blue and dark shades of violet require the most. The quantity of alcohol used varies also in proportion as the solution is effected under pressure or not.

The vessels used for dissolving may be of any suitable form; but to prevent loss of alcohol I prefer closed metallic vessels, and for the same reason I prefer closed metallic vessels for the subsequent precipitation, and supply each of them with suitable agitators.

In the vessel used for precipitation I put about two hundred to four hundred parts of cold water, or about two hundred to four hundred parts of a cold solution of common salt containing about one part of salt to five parts of water, or about two hundred to four hundred parts of cold water containing three parts of caustic potash, soda, or ammonia, or their carbonates, or the same quantity of a mixture of any proportion of the before-mentioned saline or alkaline solutions. During brisk and constant agitation of the precipitating liquid I allow the alcoholic solution of the coloring-matter to fall into it, either in single drops or a very fine stream, and by these means I precipitate the previously-dissolved coloring-matter in this fine state of subdivision. The insoluble color is now separated from the filtrate by any of the well-known kinds of filters or by a centrifugal drainer. The precipitate, after washing, is then ready for use. The filtrate is then submitted to any of the known means of distillation for the purpose of recovering the contained alcohol in a concentrated form, which recovered alcohol is then used for dissolving further quantities of the colors. I can also effect this fine subdivision of the said colors by dissolving them perfectly in commercial aniline. The clear solution thus obtained is then allowed to drop, under the same conditions as those described for the first process, into twenty times its quantity of cold water containing hydrochloric acid of 22° Baumé equal to one and a quarter times its weight of the aniline used. The so-obtained precipitate is then separated from the filtrate by the means specified in the first process, and after being well washed is fit for use. The filtrate is then subjected to any of the known processes for the purpose of recovering the aniline. I can also effect this fine subdivision of the said colors by dissolving them perfectly in cold commercial sulphuric acid of 66° Baumé. The clear solution thus obtained is then allowed to drop, under the same conditions as described for the first process, into twenty times its quantity of cold water containing any alkali equivalent to the quantity of sulphuric acid used. The so-obtained precipitate is then separated from the filtrate by the means specified for the first process, and after being well washed is fit for use. Although the two last-mentioned processes will answer very well in practice, I find the first one preferable.

I claim—

The rendering of the blue and violet colors of commerce obtained from magenta, and which are insoluble in water, in a fine state of subdivision, so that without further use of alcohol or other solvent they are in a fit condition for use in dyeing and printing, by first dissolving them in alcohol or aniline or sulphuric acid, and subsequently allowing the solutions so obtained, under brisk and constant agitation, to drop into cold water alone, or into cold water containing in solution neutral salts, caustic, or carbonated alkali, or, (as in the second-described process,) when aniline is used, into cold water containing hydrochloric acid, or, (as in the last process,) when sulphuric acid is used, into cold water containing an equivalent amount of alkali to the sulphuric acid employed, and subsequently recovering the solvent used, as described in the two first processes.

Done at the city of Manchester, England, this 27th day of June, 1865.

AUGUST SAMUEL LEOPOLD LEONHARDT.

Witnesses:
   JOHN BLOODWORTH,
   G. SEPTIMUS HUGHES,
   *Patent Agents, 20 Cross Street, Manchester.*